(12) United States Patent
Asakawa et al.

(10) Patent No.: US 10,858,952 B2
(45) Date of Patent: Dec. 8, 2020

(54) VARIABLE DISPLACEMENT TURBOCHARGER

(71) Applicant: IHI Corporation, Koto-ku (JP)

(72) Inventors: Takao Asakawa, Tokyo (JP); Kenichi Segawa, Tokyo (JP); Takahiro Kobayashi, Tokyo (JP); Ryota Sakisaka, Tokyo (JP); Kazuko Takeuchi, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 192 days.

(21) Appl. No.: 16/244,254

(22) Filed: Jan. 10, 2019

(65) Prior Publication Data

US 2019/0145274 A1    May 16, 2019

Related U.S. Application Data

(63) Continuation of application No. PCT/JP2017/029331, filed on Aug. 15, 2017.

(30) Foreign Application Priority Data

Aug. 24, 2016 (JP) .................................. 2016-163300

(51) Int. Cl.
*F01D 17/16* (2006.01)
*F02B 37/24* (2006.01)
*F02B 39/00* (2006.01)

(52) U.S. Cl.
CPC .......... *F01D 17/165* (2013.01); *F01D 17/16* (2013.01); *F02B 37/24* (2013.01); *F02B 39/00* (2013.01);

(Continued)

(58) Field of Classification Search
CPC .......... F01D 17/165; F01D 9/41; F02B 37/22; F02C 6/12
See application file for complete search history.

(56) References Cited

U.S. PATENT DOCUMENTS

| 6,623,240 B2 * | 9/2003 | Ertl ........................ F01D 17/165 415/163 |
| 8,992,164 B2 * | 3/2015 | Ramb ................... F01D 17/165 415/155 |

(Continued)

FOREIGN PATENT DOCUMENTS

| CN | 103649492 A | 3/2014 |
| CN | 104428494 A | 3/2015 |

(Continued)

OTHER PUBLICATIONS

English translation of written opinion from WIPO search (Year: 2019).*

(Continued)

*Primary Examiner* — Eldon T Brockman
*Assistant Examiner* — Wesley Le Fisher
(74) *Attorney, Agent, or Firm* — Oblon, McClelland, Maier & Neustadt, L.L.P.

(57) ABSTRACT

A projecting portion is formed on a nozzle ring, projects to a radially outer side with respect to a cylindrical portion, extends in a circumferential direction, and is held in abutment against a housing from a side of a link plate. A plate is faced to the nozzle ring on a side of a nozzle vane, and is configured to form a flow passage in a clearance to the nozzle ring. A pin is inserted into a first insertion portion formed in the nozzle ring and a second insertion portion formed in the plate, and to which the nozzle ring and the plate are mounted while the clearance is maintained. A counter bore groove is formed in the first insertion portion (Continued)

of the nozzle ring on the side of the link plate, and cut out the projecting portion.

6 Claims, 5 Drawing Sheets

(52) U.S. Cl.
CPC ...... *F05D 2240/40* (2013.01); *F05D 2250/42* (2013.01); *F05D 2250/51* (2013.01); *F05D 2260/406* (2013.01); *Y02T 10/12* (2013.01)

(56) References Cited

U.S. PATENT DOCUMENTS

| | | | |
|---|---|---|---|
| 9,664,061 B2 * | 5/2017 | Radke | F01D 17/16 |
| 2005/0252210 A1 | 11/2005 | Shiraishi et al. | |
| 2006/0034684 A1 | 2/2006 | Metz et al. | |
| 2007/0068155 A1 | 3/2007 | Hayashi et al. | |
| 2010/0260597 A1 * | 10/2010 | Sausse | F01D 17/165 |
| | | | 415/160 |
| 2014/0147254 A1 | 5/2014 | Tashiro et al. | |
| 2014/0341718 A1 | 11/2014 | Uesugi et al. | |
| 2014/0341719 A1 | 11/2014 | Uesugi et al. | |
| 2015/0132113 A1 | 5/2015 | Jaenike | |
| 2015/0167685 A1 | 6/2015 | Krausche et al. | |
| 2017/0234153 A1 * | 8/2017 | Williams | F01D 25/162 |
| | | | 415/148 |

FOREIGN PATENT DOCUMENTS

| | | |
|---|---|---|
| CN | 104508255 A | 4/2015 |
| DE | 10 2008 020 732 A1 | 11/2009 |
| DE | 10 2012 106 789 A1 | 1/2014 |
| DE | 10 2014 209 195 A1 | 11/2014 |
| EP | 1 536 103 A1 | 6/2005 |
| EP | 2 762 699 A1 | 8/2014 |
| EP | 2 861 834 | 4/2015 |
| EP | 2 881 561 A1 | 6/2015 |
| JP | 2003-254075 | 9/2003 |
| JP | 2003-278555 | 10/2003 |
| JP | 2005-163783 | 6/2005 |
| JP | 2006-514191 | 4/2006 |
| JP | 2007-056791 | 3/2007 |
| JP | 3911431 | 5/2007 |
| JP | 2009-19548 | 1/2009 |
| JP | 2009-243374 | 10/2009 |
| JP | 4370253 B2 * | 11/2009 |
| JP | 2010-090715 | 4/2010 |
| JP | 2010-169101 | 8/2010 |
| JP | 2010-180864 | 8/2010 |
| JP | 2010-196653 | 9/2010 |
| JP | 2010-223120 | 10/2010 |
| JP | 2010-229908 | 10/2010 |
| JP | 4741709 | 8/2011 |
| JP | 2012-17705 | 1/2012 |
| JP | 2013-072401 | 4/2013 |
| JP | 2013-163972 | 8/2013 |
| JP | 2014-224497 | 12/2014 |
| JP | 2014-224498 | 12/2014 |
| JP | 2015-113720 | 6/2015 |
| JP | 2015-521707 | 7/2015 |
| JP | 2015-526633 | 9/2015 |
| JP | 5807037 | 11/2015 |
| RU | 2015 101 158 A | 8/2016 |
| WO | WO 2011/068267 A1 | 6/2011 |
| WO | WO 2013/047123 A1 | 4/2013 |
| WO | WO 2013/189506 A1 | 12/2013 |
| WO | WO 2014/015958 A1 | 1/2014 |

OTHER PUBLICATIONS

English translation of JP4370253B2 (Year: 2009).*
International Search Report dated Oct. 24, 2017 in PCT/JP2017/029331 filed Aug. 15, 2017 (with English Translation).
Written Opinion dated Oct. 24, 2017 in PCT/JP2017/029331 filed Aug. 15, 2017.

* cited by examiner

VARIABLE DISPLACEMENT TURBOCHARGER

CROSS REFERENCE TO RELATED APPLICATIONS

This application is a continuation application of International Application No. PCT/JP2017/029331, filed on Aug. 15, 2017, which claims priority to Japanese Patent Application No. 2016-163300, filed on Aug. 24, 2016, the entire contents of which are incorporated by reference herein.

BACKGROUND ART

Technical Field

The present disclosure relates to a variable capacity turbocharger including link plates to which nozzle vanes are mounted.

Related Art

Hitherto, a turbocharger of a variable capacity type has been widely used. In such a turbocharger, for example, as disclosed in Patent Literature 1, a plurality of nozzle vanes are annularly arrayed in a flow passage for introducing exhaust gas from a turbine scroll flow passage to a turbine impeller. The nozzle vanes are mounted to shaft portions. When the shaft portions are rotated by power of an actuator, angles of the nozzle vanes are changed in the flow passage along with the rotation of the shaft portions. A flow passage width (so-called nozzle throat width) is changed. In such a manner, a flow rate of the exhaust gas flowing through the flow passage is controlled.

The shaft portions are inserted into a nozzle ring. Link plates are mounted to end portions of the shaft portions projecting from the nozzle ring. A drive ring includes a main body portion having an annular shape. Engagement grooves with which the link plates engage are formed in an inner peripheral surface of the main body portion. Moreover, a plurality of guide rollers are held in abutment against the inner peripheral surface of the main body portion while avoiding locations of the engagement grooves. The drive ring is supported by the guide rollers. When the drive ring is rotated by the power of the actuator, the link plates engaging with the drive ring swing. In such a manner, the shaft portions and the nozzle vanes rotate.

CITATION LIST

Patent Literature

Patent Literature 1: Japanese Patent No. 5807037

SUMMARY

Technical Problem

Incidentally, in recent years, a reduction in size of the turbocharger has come to be required. Consequently, there is a demand for development of a technology of reducing the size of the mechanism configured to drive the nozzle vanes.

Therefore, it is an object of the present disclosure to provide a variable capacity turbocharger which can be reduced in size.

Solution to Problem

In order to achieve the above-mentioned object, according to one embodiment of the present disclosure, there is provided a variable capacity turbocharger, including: a plurality of nozzle vanes each including a shaft portion; a nozzle ring including a cylindrical portion having shaft holes configured to axially support the shaft portions; link plates each including: a mounting portion, to which a portion of the shaft portion projecting from the shaft hole on a side opposite to the nozzle vane is mounted; and an extension portion extending from the mounting portion to a radially outer side of the nozzle ring; a drive ring including: a main body portion, which has an annular shape, and is supported so as to be rotatable by the cylindrical portion of the nozzle ring; and projection portions, which are formed on the main body portion, and are faced to the extension portions of the link plates in a circumferential direction of the main body portion; a facing member, which is faced to the nozzle ring on a side of the nozzle vanes, and forms a flow passage in a clearance to the nozzle ring; pins, which are inserted into first insertion portions formed in the nozzle ring and second insertion portions formed in the facing member, and to which the nozzle ring and the facing member are mounted while the clearance is maintained; a projecting portion, which is formed on the nozzle ring, projects to the radially outer side with respect to the cylindrical portion, extends in the circumferential direction, and is held in abutment against a housing from a side of the link plates; and counter bore grooves, which are formed in the first insertion portions of the nozzle ring on the side of the link plates, and cut out the projecting portion.

The variable capacity turbocharger may further include an elastic member, which is held in abutment against the nozzle ring on the side of the link plates, and is configured to press the nozzle ring against the housing from the side of the link plates.

The first insertion portion and the second insertion portion are equal in length in the insertion direction of the pin.

In order to achieve the above-mentioned object, according to another embodiment of the present disclosure, there is provided a variable capacity turbocharger, including: a plurality of nozzle vanes each including a shaft portion; a nozzle ring including a cylindrical portion having shaft holes configured to axially support the shaft portions are formed; link plates each including: a mounting portion, to which a portion of the shaft portion projecting from the shaft hole on a side opposite to the nozzle vane is mounted; and an extension portion extending from the mounting portion to a radially outer side of the nozzle ring; a drive ring including: an annular main body portion, which is supported so as to be rotatable by the cylindrical portion of the nozzle ring; and projection portions, which are formed on the main body portion, and are faced to the extension portions of the link plates in a circumferential direction of the main body portion; a projecting portion, which is formed on the nozzle ring, projects to the radially outer side with respect to the cylindrical portion, extends in the circumferential direction, and is held in abutment against a housing from a side of the link plates; and a cutout portion, which is formed in one or both of abutment portions of the projecting portion held in abutment against the housing and an abutment subject portion of the housing in abutment against the projecting portion.

The variable capacity turbocharger may further include an elastic member, which is held in abutment against the nozzle ring on the side of the link plates, and is configured to press the nozzle ring against the housing from the side of the link plates.

Effects of Disclosure

According to the present disclosure, the variable capacity turbocharger can be reduced in size.

DESCRIPTION OF EMBODIMENT

Figure 1:
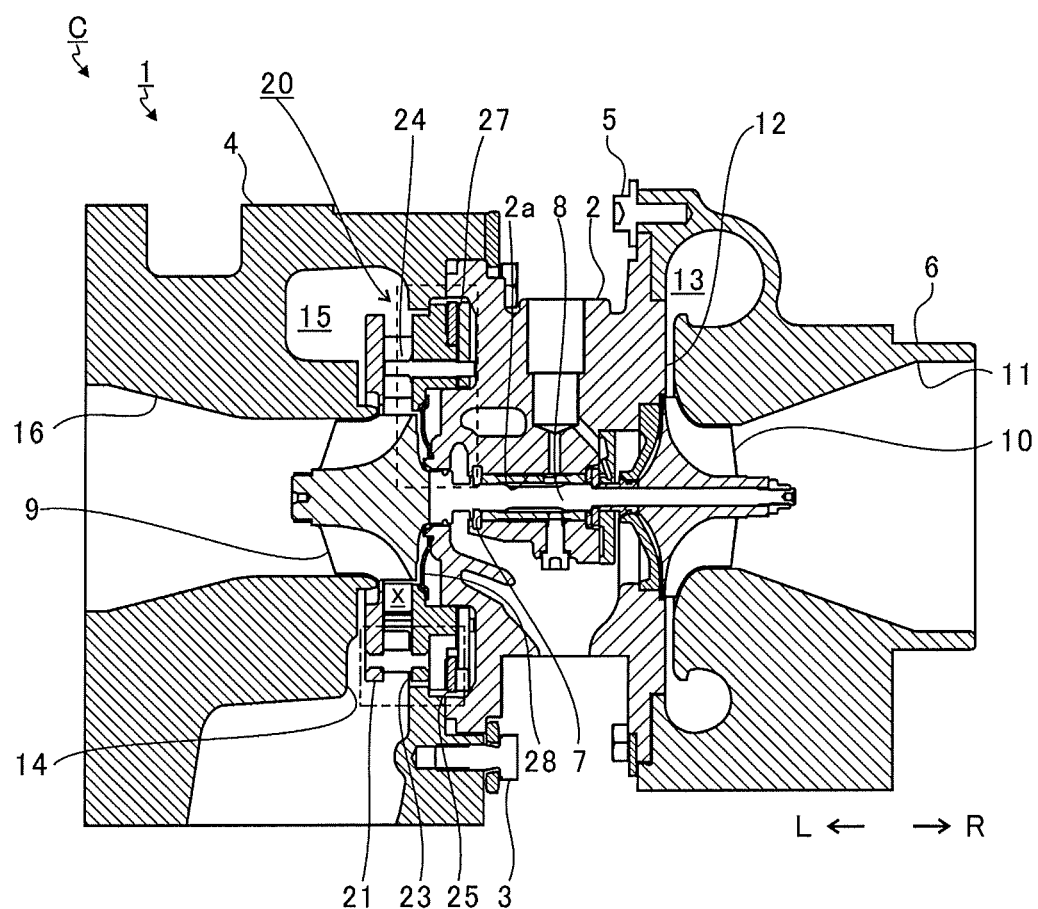
FIG. 1 is a schematic sectional view of a variable capacity turbocharger.

Now, with reference to the attached drawings, one embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a variable capacity turbocharger C (turbocharger). In the following description, the direction indicated by the arrow L illustrated in FIG. 1 corresponds to a left side of the variable capacity turbocharger C. The direction indicated by the arrow R illustrated in FIG. 1 corresponds to a right side of the variable capacity turbocharger C. As illustrated in FIG. 1, the variable capacity turbocharger C includes a turbocharger main body 1. The turbocharger main body 1 includes a bearing housing 2 (housing). A turbine housing 4 (housing) is coupled to the left side of the bearing housing 2 by a fastening bolt 3. A compressor housing 6 is coupled to the right side of the bearing housing 2 by a fastening bolt 5. The bearing housing 2, the turbine housing 4, and the compressor housing 6 are integrated.

The bearing housing 2 has a receiving hole 2a. The receiving hole 2a penetrates in a right-and-left direction of the variable capacity turbocharger C. A radial bearing 7 (in this embodiment, a semi-floating bearing is illustrated in FIG. 1 as an example) is received in the receiving hole 2a. A shaft 8 is axially supported so as to be rotatable by a radial bearing 7. A turbine impeller 9 is provided to a left end portion of the shaft 8. The turbine impeller 9 is received in the turbine housing 4 so as to be rotatable. Further, a compressor impeller 10 is provided to a right end portion of the shaft 8. The compressor impeller 10 is received in the compressor housing 6 so as to be rotatable.

The compressor housing 6 has a suction port 11. The suction port 11 is opened on the right side of the variable capacity turbocharger C. An air cleaner (not shown) is connected to the suction port 11. Further, under a state in which the bearing housing 2 and the compressor housing 6 are coupled to each other by the fastening bolt 5, a diffuser flow passage 12 is formed by facing surfaces of the bearing housing 2 and the compressor housing 6. The diffuser flow passage 12 increases pressure of air. The diffuser flow passage 12 is annularly formed so as to extend from an inner side to an outer side in a radial direction of the shaft 8. The diffuser flow passage 12 communicates with the suction port 11 on the inner side in the radial direction through intermediation of the compressor impeller 10.

Further, the compressor housing 6 has a compressor scroll flow passage 13. The compressor scroll flow passage 13 has an annular shape. The compressor scroll flow passage 13 is positioned on the outer side in the radial direction of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in pressure and speed during a course of flowing through blades of the compressor impeller 10. The air increased in speed and pressure is increased in pressure (pressure recovery) in the diffuser flow passage 12 and the compressor scroll flow passage 13, and is introduced to the engine.

Further, under a state in which the bearing housing 2 and the turbine housing 4 are coupled to each other by the fastening bolt 3, a clearance 14 is formed between facing surfaces of the bearing housing 2 and the turbine housing 4. The clearance 14 is a space which defines a flow passage "x" allowing nozzle vanes 24, which are described later, to be arranged therein and allowing exhaust gas to flow therethrough. The clearance 14 is annularly formed so as to extend from an inner side toward an outer side in the radial direction of the shaft 8 (turbine impeller 9).

Further, the turbine housing 4 has a discharge port 16. The discharge port 16 communicates with the turbine scroll flow passage 15 through the turbine impeller 9. The discharge port 16 faces a front side of the turbine impeller 9. The discharge port 16 is connected to an exhaust gas purification device (not shown).

The turbine scroll flow passage 15 communicates with a gas inflow port (not shown). Exhaust gas discharged from the engine is introduced to the gas inflow port. The turbine scroll flow passage 15 communicates also with the flow passage "x" described above. Thus, the exhaust gas introduced through the gas inflow port to the turbine scroll flow passage 15 is introduced to the discharge port 16 through the flow passage "x" and the turbine impeller 9. That is, the flow passage "x" is a passage extending from the turbine scroll flow passage 15 to the turbine impeller 9. The turbine impeller 9 rotates during a course of flow of the exhaust gas. Then, a rotational force of the turbine impeller 9 described above is transmitted to the compressor impeller 10 through the shaft 8. By the rotational force of the compressor impeller 10, the air is increased in pressure and is introduced to the suction port of the engine as described above.

At this time, when the flow rate of the exhaust gas introduced to the turbine housing 4 changes, the rotation amounts of the turbine impeller 9 and the compressor impeller 10 change. In some cases, depending on an operating condition of the engine, the air increased in pressure to a desired pressure cannot sufficiently be introduced to the suction port of the engine. Thus, a nozzle drive mechanism 20 configured to change a flow passage width (a nozzle throat width described later) of a flow passage "x" of the turbine housing 4 is provided in the variable capacity turbocharger C.

The nozzle drive mechanism 20 changes the flow speed of the exhaust gas introduced to the turbine impeller 9 in accordance with a flow rate of the exhaust gas. Specifically, when the rotation speed of the engine is low, and the flow rate of the exhaust gas is small, the nozzle drive mechanism 20 reduces an opening degree of the nozzle of the flow passage "x". In such a manner, the flow speed of the exhaust gas introduced to the turbine impeller 9 increases. The turbine impeller 9 rotates with even a small flow rate. Now, description is made of a configuration of the nozzle drive mechanism 20.

Figure 2:
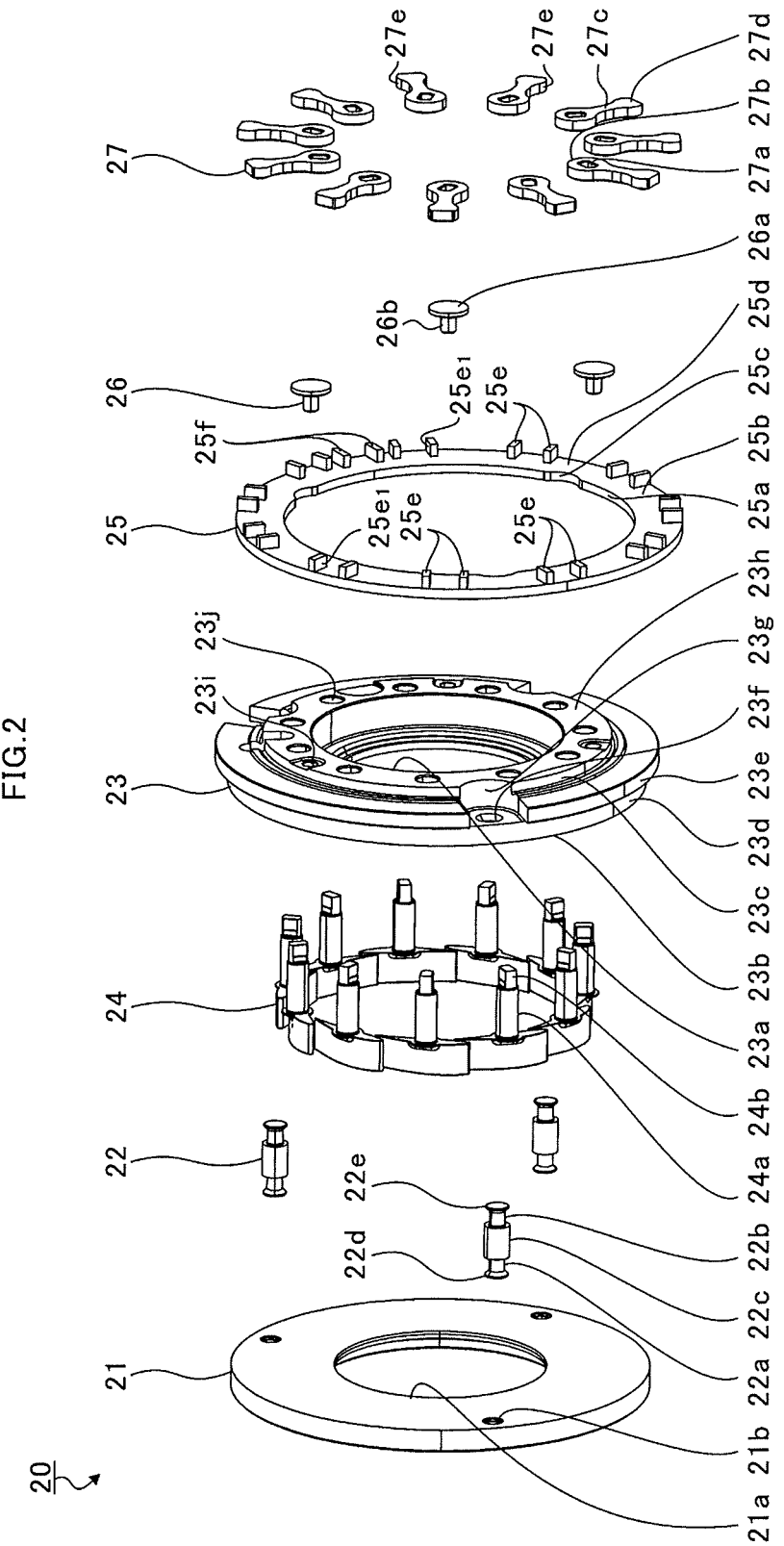
FIG. 2 is an exploded perspective view of a nozzle drive mechanism.

FIG. 2 is an exploded perspective view of the nozzle drive mechanism 20. As illustrated in FIG. 2, the nozzle drive mechanism 20 includes a plate 21 (facing member). The plate 21 has a plate shaft hole 21a. The plate shaft hole 21a penetrates in an axial direction of the shaft 8 (hereinafter referred to as "axial direction"). The plate 21 has, for example, a flat plate shape having a circular cross-sectional shape in a direction orthogonal to the axial direction of the shaft 8. On an outer peripheral surface side of the plate 21, there are formed plate pin holes 21b (second insertion portion). The plate pin holes 21b penetrate through the plate 21 in the axial direction.

A plurality of (three in the example of FIG. 2) plate pin holes 21b are formed apart from each other in a circumferential direction of the plate 21. One ends of pins 22 are inserted through the plate pin holes 21b, respectively.

The nozzle ring 23 includes a main body 23b having an annular shape. The main body 23b is positioned on a compressor impeller 10 side (right side in FIG. 1) with respect to the plate 21. A ring shaft hole 23a is formed on the main body 23b. The ring shaft hole 23a passes through the main body 23b in the axial direction. A cylindrical portion 23c is formed on a portion of the main body 23b on a side opposite to the plate 21. The cylindrical portion 23c projects to a side apart from the plate 21.

Moreover, a projecting portion 23e is formed on an outer peripheral surface 23d of the main body 23b. The projecting portion 23e extends in a circumferential direction of the main body 23b. The projecting portion 23e projects to the radially outer side with respect to the main body 23b (cylindrical portion 23c). Ring pin holes 23f (first insertion portions) are formed in portions of the main body 23b faced to the plate pin holes 21b of the plate 21. The ring pin holes 23f pass through the main body 23b in the axial direction. A plurality of (for example, three in the example illustrated in FIG. 3) counter bore grooves 23g are formed apart in the main body 23b in the circumferential direction. The counter bore grooves 23g are positioned on a cylindrical portion 23c side. The ring pin holes 23f are opened in the counter bore grooves 23g. The pins 22 are inserted into the ring pin holes 23f.

A large-diameter portion 22c is formed between both of end portions 22a and 22b in the pin 22. An outer diameter of the large-diameter portion 22c is larger than outer diameters of both of the end portions 22a and 22b. The end portions 22a of the pins 22 are inserted into the plate pin holes 21b. The large-diameter portion 22c is held in abutment against a surface of the plate 21 faced to the nozzle ring 23. In such a manner, insertion positions of the pins 22 with respect to the plate pin holes 21b are determined. Similarly, end portions 22b of the pins 22 are inserted into the ring pin holes 23f. The large-diameter portion 22c is held in abutment against a surface of the nozzle ring 23 faced to the plate 21.

In such a manner, insertion positions of the pins 22 with respect to the ring pin holes 23f are determined. On this occasion, large-diameter portions 22d and 22e are illustrated at ends on further outer sides of both of the end portions 22a and 22b of the pin 22. When the pins 22 are assembled to the plate 21 or the nozzle ring 23 through caulking, the shapes of the pins 22 after the caulking are illustrated as an example. The shape of the pin 22 before the insertion into the plate pin hole 21b of the plate 21 or the ring pin hole 23f of the nozzle ring 23 is, for example, such that pin portions having the same radii as those of both of the end portions 22a and 22b of the pin 22 are formed so as to extend to the most end portions.

In such a manner, a facing clearance between the plate 21 and the nozzle ring 23 is defined by the pins 22. In other words, the pins 22 are mounted so that the plate 21 and the nozzle ring 23 maintain the clearance. The flow passage "x" is formed as the clearance across which the plate 21 and the nozzle ring 23 are faced to one another. An axial length of the flow passage "x" is defined by the pins 22.

Guide holes 23i are opened on an axial end surface 23h (on the side opposite to the plate 21) in the cylindrical portion 23c of the nozzle ring 23. A plurality of (three in the example of FIG. 2) guide holes 23i are formed apart in the circumferential direction in the cylindrical portion 23c.

Moreover, shaft portion holes 23j (shaft holes) are formed in the nozzle ring 23. The shaft portion holes 23j pass through the main body 23b and the cylindrical portion 23c in the axial direction. A plurality of (eleven in the example of FIG. 2) shaft portion holes 23j are formed apart in the circumferential direction of the main body 23b.

A plurality of (eleven in the example of FIG. 2) nozzle vanes 24 are provided apart in the circumferential direction (the rotation direction of the turbine impeller 9) of the main body 23b similarly to the shaft portion holes 23j. The nozzle vanes 24 are positioned in the clearance (namely, the flow passage "x") between the plate 21 and the nozzle ring 23. In other words, the plate 21 is faced to the nozzle ring 23 on a nozzle vane 24 side.

A shaft portion 24a is formed on the nozzle vane 24. The shaft portion 24a projects to a nozzle ring 23 side. The shaft portion 24a is inserted into the shaft portion hole 23j so as to be axially supported (in a cantilever state). In the foregoing, description is made of the case in which the shaft portions 24a are axially supported by the nozzle ring 23. However, the shaft portions 24a may also extend toward the plate 21 side, and holes configured to axially support the shaft portions 24a may be formed in the plate 21. In other words, the shaft portion 24a may be inserted into both of the shaft portion hole 23j of the nozzle ring 23 and the hole formed in the plate 21, and may be axially supported by both of the holes (in a double-shaft support state).

The drive ring 25 includes a main body portion 25b having an annular shape. A drive shaft hole 25a is formed in the main body portion 25b. The drive shaft hole 25a passes through the main body portion 25b in the axial direction. An inner diameter of the drive shaft hole 25a is slightly larger than an outer diameter of the cylindrical portion 23c of the nozzle ring 23. The cylindrical portion 23c is fitted to the drive shaft hole 25a of the drive ring 25. In such a manner, the drive ring 25 is supported by the outer peripheral surface 23d of the cylindrical portion 23c so as to be rotatable.

A guide pin 26 includes a head portion 26a and a small-diameter portion 26b having an outer diameter smaller than that of the head portion 26a. The small-diameter portion 26b is, for example, press-fitted to the guide hole 23i, and is held.

Figure 3:
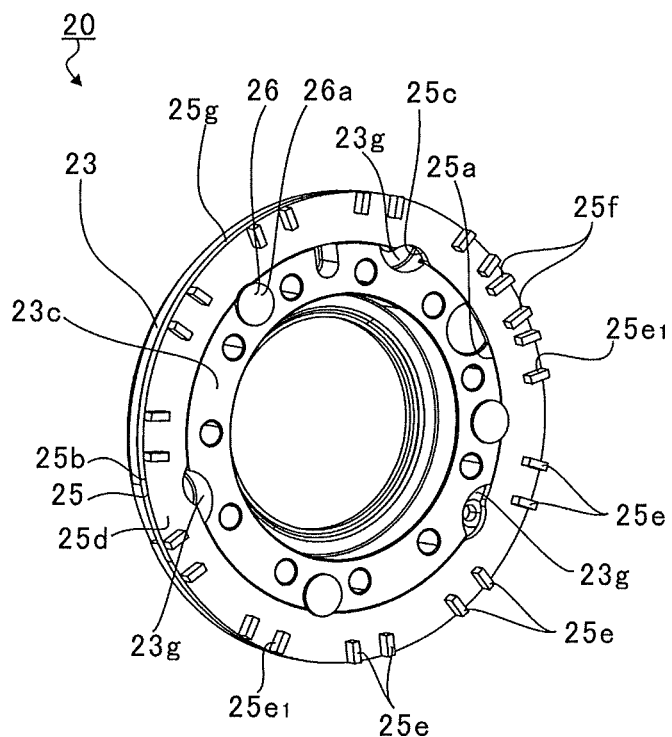
FIG. 3 is an explanatory view for illustrating a structure for preventing detachment of a drive ring through use of guide pins.

FIG. 3 is an explanatory view for illustrating a structure for preventing detachment of the drive ring 25 through use of the guide pins 26. In FIG. 3, the nozzle ring 23, the drive ring 25, and the guide pins 26 of the nozzle drive mechanism 20 are extracted and illustrated.

As illustrated in FIG. 3, the cylindrical portion 23c of the nozzle ring 23 is inserted into the drive shaft hole 25a of the drive ring 25. The guide holes 23i (see FIG. 2) are positioned on a radially inner side of the drive ring 25. The small-diameter portions 26b (see FIG. 2) of the guide pins 26 are press-fitted to the guide holes 23i. The head portions 26a of the guide pins 26 slightly extend to the radially outer side with respect to the drive shaft holes 25a of the drive ring 25. An axial movement of the drive ring 25 is restricted with a part of the head portion 26a being faced to (held in abutment against) the drive ring 25 in the axial direction.

Moreover, inner peripheral grooves 25c are formed in an inner peripheral surface of the drive shaft hole 25a. The inner peripheral grooves 25c are recessed to the radially outer side. The inner peripheral grooves 25c as many as the guide pins 26 are formed apart in the peripheral direction. The nozzle ring 23 and the drive ring 25 are rotated relative to one another so that a rotation phase of one of the inner peripheral grooves 25c matches the head portion 26a of the guide pin 26. On this occasion, other inner peripheral grooves 25c respectively match other guide pins 26 in rotation phase. The inner peripheral grooves 25c are recessed to the radially outer side more than the head portions 26a. The drive ring 25 can be mounted to and removed from the nozzle ring 23 in a state in which the rotation phases of the guide pins 26 and the inner peripheral grooves 25c are matching one another.

For example, the guide pins 26 are press-fitted to the guide holes 23i before the drive ring 25 is assembled to the nozzle ring 23. Then, the inner peripheral grooves 25c of the drive ring 25 are brought to be faced to the head portions 26a of the guide pins 26. In such a manner, the drive ring 25 can be assembled to the nozzle ring 23. Therefore, the guide pins 26 can be press-fitted to the guide holes 23i before the pins 22 and the like are assembled to the nozzle ring 23. There is no fear for deformation of the pins 22 and the like. Thus, control of a press-fitting load is not required. Specifically, ease of the operation increases compared with a case in which the press-fitting load is managed in such a manner that the guide pins 26 are press-fitted until the guide pins 26 come in abutment against bottom surfaces of the guide holes 23i or the like.

Moreover, first projection portions 25e (projection portions) and second projection portions 25f are formed on an end surface 25d out of the main body portion 25b of the drive ring 25 on a side opposite to the nozzle ring 23.

Each of the first projection portions 25e and the second projection portions 25f has, for example, a rectangular parallelepiped shape. However, the shape of the first projection portions 25e and the second projection portions 25f is not limited to the rectangular parallelepiped, and can be replaced by various shapes such as a cylindrical shape. The first projection portions 25e and the second projection portions 25f extend to an outer peripheral end (outer peripheral edge) of the end surface 25d. However, the first projection portions 25e and the second projection portions 25f may be apart from the outer peripheral end of the end surface 25d toward a radially inner side.

A plurality of (twenty two in the example of FIG. 2, which is as many as twice the number of the nozzle vanes 24) first projection portions 25 are arranged apart in a circumferential direction of the main body portion 25b. The first projection portion 25e is closer to one of the first projection portions 25e adjacent in the circumferential direction than another first projection portion 25e thereof.

Each of facing surfaces of the first projection portions 25e adjacent to one another has, for example, a flat surface shape. However, the shape of each of the facing surfaces of the first projection portions 25e adjacent to one another is not limited to the flat surface shape, and may be replaced by various shapes such as a curved surface shape.

Two of second projection portions 25f are arranged apart in the circumferential direction of the main body portion 25b. The first projection portions 25e and the second projection portions 25f extend from the outer peripheral surface 25g of the main body portion 25b to the radially inner side. The second projection portions 25f extend to the radially inner side more than the first projection portions 25e.

Referring back to FIG. 2, the shaft portion 24a is longer in axial length than the shaft portion hole 23j. The shaft portions 24a are inserted into the shaft portion holes 23j. A distal end portion 24b of the shaft portion 24a projects from the shaft portion hole 23j to a side opposite to the nozzle vanes 24. Then, the distal end portions 24b of the shaft portions 24a projecting from the shaft portion holes 23j of the nozzle ring 23 are inserted into the drive shaft holes 25a of the drive ring 25. The distal end portions 24b are then inserted into the link plates 27.

The link plates 27 are provided as many as the nozzle vanes 24. The link plate 27 includes a mounting portion 27b. A plate hole 27a is formed in the mounting portion 27b. The distal end portion 24b of the shaft portion 24a is inserted into the plate hole 27a. The shaft portions 24a are inserted into the plate holes 27a, and are mounted to the mounting portions 27b. The link plates 27 rotate together with the shaft portions 24a.

An extension portion 27c is formed continuously to the mounting portion 27b. The extension portions 27c extend to the radially outer side of the nozzle ring 23. The mounting portions 27b and the extension portions 27c are positioned on the side opposite to the nozzle vanes 24 with respect to the drive ring 25. Then, a distal end portion 27d of the extension portion 27c on a side opposite to the mounting portion 27b is arranged between two of the first projection portions 25e of the drive ring 25 adjacent to one another. In other words, the distal end portion 27d of the mounting portion 27b is faced to the first projection portions 25e in the circumferential direction of the main body portion 25b.

The distal end portion 27d of the mounting portion 27b is sandwiched between the first projection portions 25e close to one another. In this state, side surfaces 27e of the distal end portion 27d faced to the first projection portions 25e are, for example, parallel with side surfaces $25e_1$ of the first projection portions 25e faced to the distal end portion 27d. However, the side surface 27e of the distal end portion 27d may be inclined with respect to the side surface $25e_1$ of the first projection portion 25e.

A distance between two of the first projection portions 25e is slightly longer than a width of the distal end portion 27d. In other words, a clearance is formed between the distal end portion 27d and each of the first projection portions 25e in a state in which the distal end portion 27d is arranged between two of the first projection portions 25e.

Figure 4:
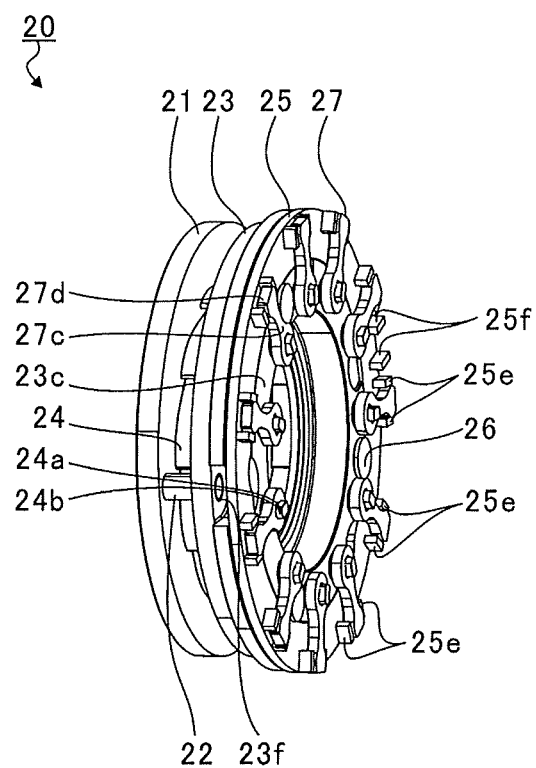
FIG. 4 is a perspective view for illustrating a state after the nozzle drive mechanism is assembled.

FIG. 4 is a perspective view for illustrating a state after the nozzle drive mechanism 20 is assembled. As described before, the pins 22 are inserted into the plate pin holes 21b (see FIG. 2) and the ring pin holes 23f. Both of the ends of the pins 22 are caulked, and the plate 21 and the nozzle ring 23 are consequently assembled to one another. Moreover, the drive ring 25 is assembled to the cylindrical portion 23c of the nozzle ring 23 so as to be rotatable. As described later, the drive shaft hole 25a (inner peripheral surface) of the drive ring 25 and the cylindrical portion 23c (outer peripheral surface) of the nozzle ring 23 are radially faced to one another. The drive ring 25 is held by the nozzle ring 23 so as to be rotatable. Moreover, an axial movement of the drive ring 25 is restricted by the guide pins 26. In other words, the guide pins 26 can serve to prevent axial detachment of the drive ring 25. The nozzle vanes 24 are positioned in the clearance (namely, the flow passage "x") between the plate 21 and the nozzle ring 23. The shaft portions 24a are axially supported by the shaft portion holes 23j of the nozzle ring 23. The link plate 27 is mounted to the distal end portion 24b of the shaft portion 24a.

A drive link plate (not shown) is fitted to the second projection plates 25f of the drive ring 25. The drive link plate is a plate-shaped member having substantially the same external shape as that of the link plate 27. The drive link plate is arranged between Two of the second projection plates 25f. Power of an actuator (not shown) is transmitted to the drive ring 25 through the drive link plate. As a result, the drive ring 25 rotates (slides) while being supported by the cylindrical portion 23c of the nozzle ring 23. The extension portion 27c (distal end portion 27d) of each of the link plates 27 is arranged between the first projection portions 25e of the drive ring 25. When the drive ring 25 rotates, the distal end portions 27d are pressed against the first projection portions 25e of the drive ring 25 in the rotation direction. The link plates 27 rotate (swing) about an axial center of the shaft portions 24a. As a result, the shaft portions 24a mounted to the link plates 27 rotate. The plurality of nozzle vanes 24 integrally rotate together with the shaft portions 24a. The flow passage width of the flow passage "x" thus changes.

For example, grooves are formed in the inner peripheral surface of the drive ring 25. A projecting portion fitted to the groove is formed on each of the link plate 27. In this case, in order to form the grooves in the inner peripheral surface of the drive ring 25, it is required that the outer diameter of the drive ring 25 be increased to a radially outer side of the grooves.

In the nozzle drive mechanism 20, the first projection portions 25e are formed on the end surface 25d of the drive ring 25. The link plate 27 is arranged between the first projection portions 25e adjacent to one another. Therefore, the diameter of the drive ring 25 can be reduced compared with the case in which the grooves are formed in the inner peripheral surface of the drive ring 25. Consequently, the size of the nozzle drive mechanism 20 and the size of the variable capacity turbocharger C to which the nozzle drive mechanism 20 is mounted can be reduced.

Moreover, the inner peripheral surface of the drive ring 25 is supported so as to be rotatable by the cylindrical portion 23c of the nozzle ring 23 over the circumferential direction. For example, a plurality of guide members (so-called roller guide) each having a cylindrical shape may be arranged apart in the circumferential direction so as to be radially faced to the inner peripheral surface of the drive ring 25. Compared with the partial support structure such as the roller guide, stability of the rotational motion of the drive ring 25 increases.

Figure 5A:
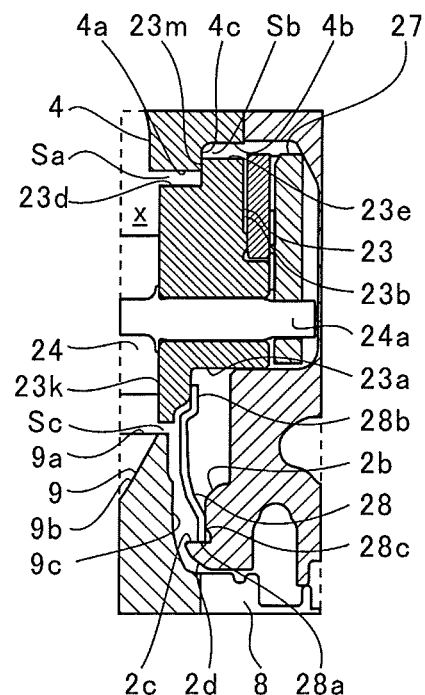
FIG. 5A is an extraction view for illustrating a broken-line portion of FIG. 1.
Figure 5B:
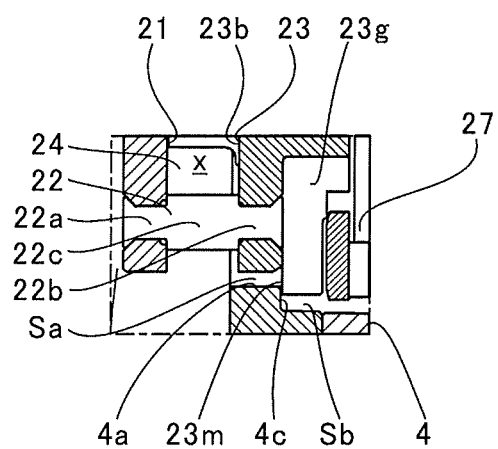
FIG. 5B is an extraction view for illustrating a one-dot chain line portion of FIG. 1.

FIG. 5A is an extraction view for illustrating a broken-line portion of FIG. 1. FIG. 5B is an extraction view for illustrating a one-dot chain line portion of FIG. 1.

As illustrated in FIG. 5A, at least a part of the main body 23b of the nozzle ring 23 is positioned inside the turbine housing 4. A projecting wall portion 4a is formed on the turbine housing 4. The projecting wall portion 4a projects to a radially inner side of the shaft 8. A clearance Sa is formed between the projecting wall portion 4a and an outer peripheral surface 23d of the main body 23b on a left side (nozzle vane 24 side) in FIG. 5A with respect to the projecting portion 23e.

Then, the projecting portion 23e is held in abutment against the projecting wall portion 4a from a link plate 27 side (bearing housing 2 side). A clearance Sb is formed between the wall portion 4b of the turbine housing 4 positioned on the radially outer side of the projecting portion 23e and the outer peripheral surface of the projecting portion 23e.

In this configuration, an abutment surface 23m (abutment portion) is an end surface of the projecting portion 23e on a projecting wall portion 4a side. The abutment surface 23m is held in abutment against the projecting wall portion 4a. An abutment surface 4c (abutment subject portion) is an end surface of the projecting wall portion 4a on a projecting portion 23e side. The abutment surface 4c is held in abutment against the projecting portion 23e.

Moreover, a shaft hole projection 23k is formed on a left side of FIG. 5A (the nozzle vane 24 side, which is a side opposite to the link plates 27) of the inner peripheral surface of the ring shaft hole 23a of the nozzle ring 23. The shaft hole projection 23k projects to the radially inner side. The blades 9a of the turbine impeller 9 are provided so as to stand on the impeller main body 9b. The shaft hole projection 23k is positioned on the radially outer side with respect to the impeller main body 9b. A clearance Sc is provided between the shaft hole projection 23k and the impeller main body 9b.

An annular projection 2c is formed on a wall portion 2b of the bearing housing 2 positioned on a back surface 9c side of the impeller main body 9b. The annular projection 2c projects on the back surface 9c side. A housing hole 2d is opened in the annular projection 2c. The shaft 8 is inserted into the housing hole 2d.

A plate spring 28 (elastic member) is an annular member. An insertion hole 28a is formed in the plate spring 28. The annular projection 2c (shaft 8) is inserted into the insertion hole 28a. The plate spring 28 is arranged between the back surface 9c of the turbine impeller 9 and the wall portion 2b of the bearing housing 2.

An outer contact portion 28b of the plate spring 28 on a radially outer side is brought into contact with the shaft hole projection 23k of the nozzle ring 23 from the link plate 27 side. Moreover, an inner contact portion 28c is a portion of the plate spring 28 on a radially inner side with respect to the outer contact portion 28b. The inner contact portion 28c is brought into contact with the wall portion 2b of the bearing housing 2 from a turbine impeller 9 side.

Then, the plate spring 28 is supported by the bearing housing 2 through the inner contact portion 28c. The plate spring 28 is configured to apply an elastic force to the nozzle ring 23 from the outer contact portion 28b. The plate spring 28 is configured to press the nozzle ring 23 to the left side in FIG. 5A (a direction from the link plates 27 to the nozzle vanes 24).

Moreover, the outer contact portion 28b is pressed against the shaft hole projection 23k. The inner contact portion 28c is pressed against the wall portion 2b. In such a manner, the plate spring 28 seals both of the contact portions. The plate spring 28 also provides a heat shielding function of suppressing transfer of heat of the exhaust gas to a radial bearing 7 side.

In such a manner, the projecting portion 23e is pressed against the projecting wall portion 4a of the turbine housing 4 by the plate spring 28. As a result, the nozzle ring 23 is positioned (held) inside the bearing housing 2 and the turbine housing 4.

For example, when one member of the nozzle drive mechanism 20 needs to be sandwiched between the bearing housing 2 and the turbine housing 4, the sandwiched portion needs to project to the radially outer side of the shaft 8.

In this embodiment, the radially inner side of the nozzle ring 23 is pressed by the plate spring 28. The radially outer side of the nozzle ring 23 is pressed against and supported by the projecting wall portion 4a of the turbine housing 4. The nozzle ring 23 only needs to be faced to the projecting wall portion 4a in the axial direction. Therefore, the size of the nozzle drive mechanism 20 and the size of the variable capacity turbocharger C to which the nozzle drive mechanism 20 is mounted can be reduced compared with the case of the sandwiching between the bearing housing 2 and the turbine housing 4.

Moreover, the pressure becomes high on a flow passage "x" side when the exhaust gas communicates. An axial force acts on the nozzle vanes 24 through a pressure difference on the link plate 27 side. Therefore, when a difference between a pressure acting on the nozzle vanes 24 from the left side in FIG. 5A and a pressure acting on the shaft portions 24a from the right side is large, the nozzle vanes 24 are pressed to the right side (link plate 27 side). The position of the nozzle vanes 24 is thus displaced to the link plate 27 side (the side opposite to the plate 21). When a clearance between the plate 21 arranged on a radially outer side of a blade side (left side of FIG. 5A) of the turbine impeller 9 and the nozzle vanes 24 increases as a result, a turbine performance may be degraded. The blade side of the turbine impeller 9 is a side of the turbine impeller 9 on which the blades are arranged so as to be apart in a circumferential direction. The blade side of the turbine impeller 9 is a side opposite to the back surface 9c of the main body portion of the turbine impeller 9 indicated as hatching of FIG. 5A.

As illustrated in FIG. 5A, spaces of the clearances Sa and Sb are separated from one another at a location at which the projecting portion 23e (abutment surface 23m) of the nozzle ring 23 and the projecting wall portion 4a (abutment surface 4c) of the turbine housing 4 are in abutment against one another. In other words, the spaces do not positively communicate with one another. Even when the above-mentioned pressure difference exists, the exhaust gas is less likely to flow therethrough. Thus, as illustrated in FIG. 5B, the counter bore grooves 23g (cutout portions) are formed in the nozzle ring 23.

Figure 6:
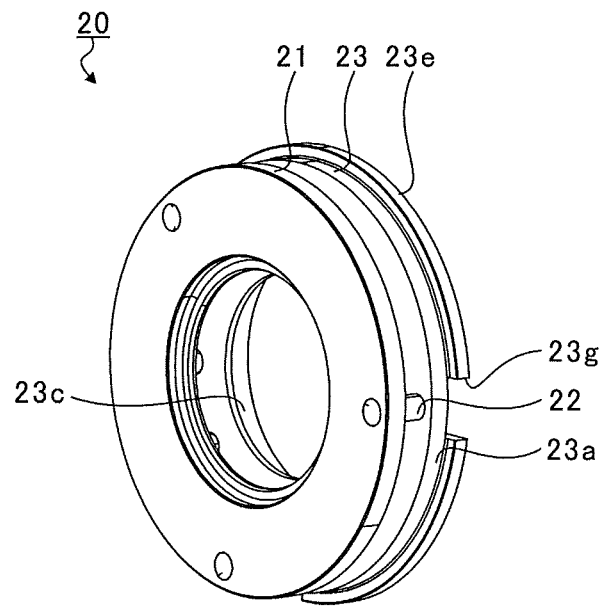
FIG. 6 is an explanatory view for illustrating a counter bore groove.

FIG. 6 is an explanatory view for illustrating the counter bore grooves 23g. In FIG. 6, the plate 21, the pins 22, and the nozzle ring 23 of the nozzle drive mechanism 20 are extracted and illustrated. As illustrated in FIG. 6, the counter bore grooves 23g of the nozzle ring 23 are formed on the cylindrical portion 23c side of the main body 23b.

The counter bore grooves 23g are formed in the abutment surface 23m of the projecting portion 23e. The counter bore grooves 23g cut out the abutment surface 23m of the projecting portion 23e. The counter bore grooves 23g are positioned in the ring pin holes 23f of the nozzle ring 23 on the link plate 27 side (the side opposite to the plate 21, which is the bearing housing 2 side). The counter bore groove 23g extends to the radially inner side of the nozzle ring 23 with respect to the ring pin hole 23f.

The ring pin hole 23f is opened in the counter bore groove 23g. The pins 22 are inserted into the ring pin holes 23f.

Then, parts of the projecting portion 23e (abutment surface 23m) are cut out by the counter bore grooves 23g.

In FIG. 5B, a section on one plane passing through the counter bore groove 23g is illustrated. In other words, in FIG. 5B, hatched portions are at equal positions (height) in a depth direction of the drawing sheet. In FIG. 5B, a location at which the counter bore groove 23g is formed is not hatched. It is appreciated from this fact that both of the clearances Sa and Sb communicate with one another through the counter bore grooves 23g. Therefore, the exhaust gas flows in from the flow passage "x" to the link plate 27 side. As a result, the pressure difference between the flow passage "x" side and the link plate 27 side decreases. The pressing force of the nozzle vanes 24 to the link plate 27 side can thus be suppressed.

Moreover, a thickness of a portion of the main body 23b of the nozzle ring 23 through which the ring pin holes 23f pass is approximately equal to a thickness of the plate 21. In other words, lengths (axial lengths) of the ring pin holes 23f and the plate 21 are equal to one another in the insertion direction of the pins 22. In such a manner, axial lengths of both of the end portions 22a and 22b of the pin 22 having a smaller diameter than that of the large-diameter portion 22c are matched one another through adjusting the depth of the counter bore grooves 23g. Therefore, even when directions of both of the end portions 22a and 22b of the pin 22 are inverted, the pin 22 can be inserted into the plate 21 and the nozzle ring 23. Consequently, a working efficiency increases.

Figure 7:
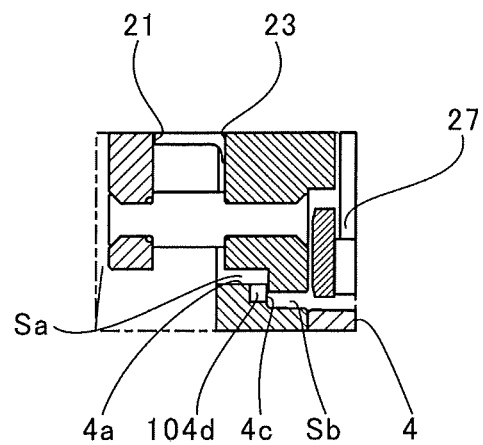
FIG. 7 is an explanatory view for illustrating a modification example.

FIG. 7 is an explanatory view for illustrating a modification example. In FIG. 7, a portion of the modification example corresponding to the one-dot chain line portion of FIG. 1 is illustrated. In the embodiment, description is made of the case in which the counter bore grooves 23g are formed in the nozzle ring 23. In the modification example, cutout portions 104d are formed in the turbine housing 4.

The cutout portions 104d are formed in the abutment surface 4c of the projecting wall portion 4a. The cutout portions 104d cutout the abutment surface 4c of the projecting wall portion 4a. A plurality of (for example, three) cutout portions 104d are formed apart in a circumferential direction of the projecting wall portion 4a (nozzle ring 23) like the counter bore grooves 23g.

In FIG. 7, a section on one plane passing through the cutout portion 104d is illustrated. In other words, in FIG. 7, hatched portions are at equal positions (height) in the depth direction of the drawing sheet. In FIG. 7, a location at which the cutout portion 104d is formed is not hatched. It is appreciated from this fact that both of the clearances Sa and Sb communicate with one another through the cutout portions 104d. Therefore, the pressing force of the nozzle vanes 24 to the link plate 27 side can thus be suppressed as in the embodiment.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

In the embodiment and the modification example, description is made of the cases in which the plate spring 28 is provided as the elastic member. However, the plate spring 28 is not a component that is essentially required. Moreover, the elastic member is not limited to the plate spring 28 as long as the elastic member can press the nozzle ring 23 against the turbine housing 4 and the bearing housing 2.

Moreover, in the embodiment and the modification example, description is made of the cases in which the projecting portion 23e is formed on the nozzle ring 23. However, another member provided independently of the nozzle ring 23 may have the function of the projecting portion 23e.

Moreover, in the embodiment, description is made of the case in which the counter bore grooves 23g are formed in the link plates 27. In the modification example, description is made of the case in which the cutout portions 104d are formed in the turbine housing 4. It is only required that any one of the counter bore grooves 23g and the cutout portions 104d be formed. Moreover, both of the counter bore grooves 23g and the cutout portions 104d may be formed.

Moreover, in the embodiment, description is made of the case in which the counter bore grooves 23g are positioned in the ring pin holes 23f of the nozzle ring 23 on the link plate 27 side. Description is also made of the case in which the ring pin holes 23f are opened in the counter bore grooves 23g. However, the positions of the counter bore grooves 23g may be separated from the ring pin holes 23f in the circumferential direction of the nozzle ring 23. Moreover, in the modification example, as illustrated in FIG. 7, description is made of the case in which the ring pin hole 23f is positioned in the section on the one plane passing through the cutout portion 104d. However, it is not always required that the ring pin hole 23f be positioned in the section on the plane passing through the cutout portion 104d. The positions of the cutout portions 104d may be separated from the ring pin holes 23f in the circumferential direction of the nozzle ring 23.

INDUSTRIAL APPLICABILITY

The present disclose can be applied to a variable capacity turbocharger including link plates to which nozzle vanes are mounted.

What is claimed is:

1. A variable capacity turbocharger, comprising:
a plurality of nozzle vanes each including a shaft portion;
a nozzle ring including a cylindrical portion having shaft holes configured to axially support the shaft portions;
link plates each including:
    a mounting portion, to which a portion of the shaft portion projecting from the shaft hole on a side opposite to the nozzle vane is mounted; and
    an extension portion extending from the mounting portion to a radially outer side of the nozzle ring;
a drive ring including:
    an annular main body portion, which is supported so as to be rotatable by the cylindrical portion of the nozzle ring; and
    projection portions, which are formed on the main body portion, and are faced to the extension portions of the link plates in a circumferential direction of the main body portion;
a facing member, which is faced to the nozzle ring on a side of the nozzle vanes, and forms a flow passage in a clearance to the nozzle ring;
pins, which are inserted into first insertion portions formed in the nozzle ring and second insertion portions formed in the facing member, and to which the nozzle ring and the facing member are mounted while the clearance is maintained;
a projecting portion, which is formed on the nozzle ring, projects to the radially outer side with respect to the cylindrical portion, extends in the circumferential direction, and is held in abutment against a housing from a side of the link plates; and
counter bore grooves, which are formed in the first insertion portions of the nozzle ring on the side of the link plates, and cut out the projecting portion.

2. A variable capacity turbocharger according to claim 1, further comprising an elastic member, which is held in abutment against the nozzle ring on the side of the link plates, and is configured to press the nozzle ring against the housing from the side of the link plates.

3. A variable capacity turbocharger according to claim 1, wherein the first insertion portion and the second insertion portion are equal in length in the insertion direction of the pin.

4. A variable capacity turbocharger according to claim 2, wherein the first insertion portion and the second insertion portion are equal in length in the insertion direction of the pin.

5. A variable capacity turbocharger, comprising:
a plurality of nozzle vanes each including a shaft portion;
a nozzle ring including a cylindrical portion having shaft holes configured to axially support the shaft portions;
link plates each including:
    a mounting portion, to which a portion of the shaft portion projecting from the shaft hole on a side opposite to the nozzle vane is mounted; and
    an extension portion extending from the mounting portion to a radially outer side of the nozzle ring;
a drive ring including:
    an annular main body portion, which is supported so as to be rotatable by the cylindrical portion of the nozzle ring; and
    projection portions, which are formed on the main body portion, and are faced to the extension portions of the link plates in a circumferential direction of the main body portion;
a projecting portion, which is formed on the nozzle ring, projects to the radially outer side with respect to the cylindrical portion, extends in the circumferential direction, and is held in abutment against a housing from a side of the link plates; and
a cutout portion, which is formed in one or both of abutment portions of the projecting portion held in abutment against the housing and an abutment subject portion of the housing held in abutment against the projecting portion.

6. A variable capacity turbocharger according to claim 5, further comprising an elastic member, which is held in abutment against the nozzle ring on the side of the link plates, and is configured to press the nozzle ring against the housing from the side of the link plates.

* * * * *